United States Patent
Engström et al.

(10) Patent No.: US 6,877,203 B2
(45) Date of Patent: Apr. 12, 2005

(54) DEVICE AND METHOD FOR FIXATION OF AIRFRAME PIECES

(75) Inventors: Magnus Engström, Linköping (SE); Mats Karlsson, Mjölby (SE); Roland Kvist, Mjölby (SE)

(73) Assignee: Saab AB, Linkoping (SE)

( * ) Notice: Subject to any disclaimer, the term of this patent is extended or adjusted under 35 U.S.C. 154(b) by 192 days.

(21) Appl. No.: 10/257,285

(22) PCT Filed: Mar. 9, 2001

(86) PCT No.: PCT/SE01/00502
§ 371 (c)(1),
(2), (4) Date: Oct. 11, 2002

(87) PCT Pub. No.: WO01/79061
PCT Pub. Date: Oct. 25, 2001

(65) Prior Publication Data
US 2003/0046801 A1 Mar. 13, 2003

(30) Foreign Application Priority Data
Apr. 13, 2000 (SE) .............................. 0001404

(51) Int. Cl.⁷ ................................................ B23Q 7/00
(52) U.S. Cl. ..................... 29/407.09; 29/407.1; 29/559; 29/709; 29/281.1; 29/281.5; 269/95; 269/909; 414/589; 901/30; 901/31; 901/36
(58) Field of Search .................... 29/407.01, 407.04, 29/407.09, 407.1, 434, 464, 466, 559, 709, 712, 714, 719, 721, 281.1, 281.5, 281.4; 269/45, 89, 95, 909; 901/1, 16, 30, 31, 35, 37, 38, 39, 40, 41; 414/589; 244/123–126

(56) References Cited

U.S. PATENT DOCUMENTS

| | | | |
|---|---|---|---|
| 4,590,578 A | | 5/1986 | Barto, Jr. et al. |
| 4,695,032 A | | 9/1987 | Desport |
| 4,830,569 A | * | 5/1989 | Jannborg .................... 414/729 |
| 4,995,146 A | * | 2/1991 | Woods ...................... 29/281.3 |
| 5,672,044 A | * | 9/1997 | Lemelson ................ 414/744.3 |
| 6,170,157 B1 | * | 1/2001 | Munk et al. ............... 29/897.2 |

FOREIGN PATENT DOCUMENTS

| | | |
|---|---|---|
| GB | 2257413 | 1/1993 |
| WO | 99/46723 | 9/1999 |

* cited by examiner

*Primary Examiner*—David P. Bryant
*Assistant Examiner*—Jermie E. Cozart
(74) *Attorney, Agent, or Firm*—Swidler Berlin LLP

(57) ABSTRACT

A method for regulating a device used for fixing aircraft airframe pieces in connection with assembly of airframe parts, where the device consists of a rig comprising a matrix of rails that can slide in such a way that a number of fixing elements attached to the rails can be positioned freely along three co-ordinates x, y, z in space within a given volume, where a manipulator grasps a fixing element after which the fixing element is moved by the manipulator to the given co-ordinate, and where the rails on which a fixing element is arranged is locked in relation to the rig by an automatic locking function initiated by the manipulator, thereby fixing the fixing element's position in space and the setting procedure is repeated for a predetermined number of fixing elements on the rig.

18 Claims, 2 Drawing Sheets

DEVICE AND METHOD FOR FIXATION OF AIRFRAME PIECES

TECHNICAL FIELD

The invention relates to a device and a method for regulating a device designed, for example, for holding a number of aircraft frames fixed in a predetermined position and for fixing the skin of the airframe in a predetermined position to allow the skin and the frames to be put together to produce an airframe section. The device can also be used to hold the airframe section in a predetermined position when parts are being fastened to the airframe section.

STATE OF THE ART

In the production of airframes, there is a need for some form of work fixture or jig, designed in such a way that the frames and the skin of a airframe section can be held firmly in place, at least at a number of points within a given volume, so that the frames can be fixed in predetermined positions and so that the skin of the airframe section can be applied to, fastened to and be held in place against the frames while the frames and the airframe skin are being fastened together. In the production of aircraft, for example, work fixtures are manufactured for each section of the airframe. Conventionally, a different work fixture is required for each type of airframe section, so that a large number of work fixtures are needed. These are designed so that a rig with a framework is welded together in such a way that a number of attachment points for the frames of the airframe are incorporated. The attachment points associated with a specific frame are measured with a high degree of tolerance.

Fixed conventional work fixtures as described above can only be used for a specific airframe section, which means that a large number of these fixed work fixtures are needed and that they can only be used for the aircraft for which they were originally produced. This is very expensive, which means that fixed work fixtures can only be used for airframes that are mass-produced. In principle, a fixed work fixture designed for a specific craft can never be reused, and as a result is scrapped when production of the aircraft has been terminated. Some semi-flexible devices are available on the market. These work fixtures can be adapted and used for several airframe sections. An example of such a semi-flexible device is given in U.S. Pat. No. 4,695,032, which describes a semi-flexible device for making a mould. A number of bars or main rails are fixed to a framework. Supporting rods hold up the fixing elements, whose positions can be varied in the axial direction. Although to some extent the described device allows the points of attachment to be individually set, the device is only partly flexible. Rigging the device is conditional on defining the position of the main rails and the guide rails before setting of the axially mobile fixing elements.

Another example of such a semi-flexible device is embodied by a mechanism having a horizontal worktable. The worktable comprises a number of rows of holes, which are arranged both lengthways and crossways on the surface of the table. The holes are designed to provide a support for upright rods, which can is be positioned on the table surface in the number required. When this device is to be rigged for a number of frames that will be used to support a section of the airframe, the said rods are positioned in rows on the table in positions corresponding to the frames' reciprocal positions in the airframe section. Each rod comprises a vertically movable fixing element, which can be moved vertically by means of a servo-motor belonging to each rod. For each row of rods corresponding to a frame's position in the airframe section, each rod's fixing element can, by means of the servo-motor, be moved and held at a height corresponding to the height required for the frame to be supported by the said rods. In this way, all the rods' fixing elements can be set to produce a shape corresponding to the curvature of the different frames, after which the frames, one at a time, can be fixed at the correct relative distance and be supported by the rods at a number of supporting points in the fixing elements, whereby the frame retains its shape and together builds up the space geometry that the skin of the particular airframe section is to have. Then the airframe section skin can be positioned against the fixed frames and be fastened to them, so that the frames and the skin are fitted to each other when they are being put together. A disadvantage of the semi-flexible solution described here is the high cost since each rod referred to above is supplied with a separate controlling mechanism for positioning the fixing element at its right height. Furthermore, there are practical difficulties caused by the plethora of cables attached to each rod for power supply and for controlling the positioning mechanism. Nor does the technical solution involving placing the said rods in the said rows according to a matrix permit variable setting of the fixing elements' positions.

An alternative model of a semi-flexible device employs, in a similar way to that above, a number of rods positioned in a matrix, i.e. in rows on a work table, but does not use individual power units for controlling the fixing elements on the rods when positioning them. Instead, a moveable portal is arranged above the work surface. This portal can be moved across the work surface and be positioned above each row of rods. The portal's overhead frame is equipped with one or more vertically operating arms, which are designed to move down to and grasp a fixing element at the top of a rod. An arm, which is automatically controlled by a control program, is then able to set each rod's fixing element at the correct height one row at a time. By locking the fixing elements to each used rod according to this pattern, the rods can support curved skins or other structures with good tolerance. A disadvantage of this semi-flexible device is still that the position of the rods in the horizontal plane can not be varied freely. Moreover, the portal robot that is used is expensive and cannot be used for tasks other than those mentioned, i.e. a manipulator in the form of the portal robot is just as specialised as the device itself.

DESCRIPTION OF THE INVENTION

According to an aspect of the invention a method is provided for regulating a device used for assembling aircraft airframe pieces, where the device consists of a rig comprising parallel main rails that can slide parallel to each other along the rig along a first co-ordinate x, and where each main rail has a number of parallel guide rails which can slide parallel to each other along the main rail along a second co-ordinate y, and where in addition each guide rail can slide axially along a third co-ordinate z, with a fixing element at the end of the guide rail, and where the method involves a manipulator grasping a guide rail's fixing element after which the fixing element is moved by the manipulator in directions x, y and z so that the fixing element is made adopt a predetermined position in space, and while the fixing element is moving:

the main rail to which the fixing element is connected is slid parallel to the x direction when the manipulator sets the fixing element at a given x coordinate, the guide rail to which the fixing element is connected is slid parallel to the y direction when the manipulator sets the fixing element at a given y coordinate, the guide rail is slid axially in the z direction so that its fixing element is set at a given z co-ordinate.

Additionally, the method involves the manipulator moving in turn to each remaining guide rail fixing element which it grasps, after which the fixing element is moved by the manipulator in the y and z direction so that the fixing element is made adopt a predetermined position in space and during this movement the guide rail to which the fixing element is connected is slid parallel to the y direction when the manipulator sets the fixing element at a given y co-ordinate, and the guide rail is slid axially in the z direction so that its fixing element is set at a given z co-ordinate. All of the above steps are repeated for each main rail until all fixing elements being used are set in the correct position.

When all fixing elements are positioned a frame is fixed to the fixing elements of each main rail after which an airframe skin is held in place against the frames by chucking to allow assembly of the frames and the skin. Conversely, an airframe skin can naturally be fastened to and be supported by the fixing elements, after which the given number of frames are braced to the skin, thus ensuring that skin and frames are fixed in relation to one another during assembly of these parts.

The invention comprises a device for implementing the method described above, as characterised in the independent claims.

An advantage of this method of assembly is that the device allows variable setting of the fixing elements.

The manipulator used in the above method is preferably constituted by an industrial robot. Employing such an industrial robot as a mechanism for regulating the fixing elements involves first entering into the robot's control system data on the orientation of the rig in relation to the robot. This is done, for example, by making the robot hand, with or without attached tools, detect one or more reference points, accurately measured, located on the arm of the rig. A reference point may consist of a square plate whose position the robot hand or the robot hand tool detects mechanically, whereupon the position data for the reference point in the form of its x, y and z co-ordinates are sent to the robot control system.

In the normal state, that is when no adjustment of the device is being executed, each main rail is locked to the rig while each guide rail is locked to a main rail Is by some type of locking device. When the device is being regulated, these locks are unlocked by the manipulator.

A coupling is arranged between the robot's tool shunter and the fixing element. This coupling may consist of a female part arranged on the fixing element and a male part on the tool shunter, which engage with one another when the robot grasps the fixing element. The coupling comprises one or more connections for engaging the guide for the lock. These connections may be embodied by pneumatic connectors for pneumatic or hydraulic unlocking via the manipulator, or electrical connectors for controlling electromagnetic or electromechanical unlocking devices via the manipulator.

An advantage of these connectors is that the power for unlocking the lock can be transferred and controlled by the manipulator without the fixing elements being effected by any force that can disturb their positions in connection with locking. Electrical, hydraulic or pneumatic energy is transferred via the coupling from the manipulator to the locks, where the manipulator merely operates as a conveyor of the energy required for unlocking. When the said energy is no longer being conveyed via the manipulator to a lock, the said lock reverts to its locked position. This type of coupling may be used for regulating the fixing elements, even if the manipulator is fixed to the device, in the form of a portal robot or equivalent, or is manually operated and employs external measuring systems for positioning the fixing elements.

An advantage of this locking function arrangement, where the power to unlock the lock is conveyed via the manipulator, is that there is no need for cabling inside the device, which would otherwise be required for transferring power to each individual lock.

Other advantages of the method and the device in accordance with the invention is that the device can be simply and quickly adjusted for new types of airframe. Consequently, the device may be used for more than one series of airframe, and in addition, it allows an airframe to be altered relatively easily and cheaply after production of a number of units in a model series. Furthermore, the same device can be used for different sections of the same airframe. The device may also be used in the future for products that at present have not yet been developed, and so can be used over a long period. Thus, such a device would be attractive in the small-scale production of vehicles and other structures, where it is not economically viable to employ fixed work fixtures or expensive semi-flexible solutions. In the case where an industrial robot is used as a manipulator for regulating the device, the invention method is particularly useful, since such an industrial robot may be used for other types of work when regulating the device is not being carried out. Examples of such work are programmed drilling, riveting, and grinding on the actual structure or airframe that is fixed to the device.

The principles of the lock will not be further described in this description, since they are already well known. Such locks may be embodied by work-holders or other friction locks, which using spring forces, for example, hold cylinders or feathers under tension and exert force between locks and rails. By applying a force against the spring force using, as mentioned above, pneumatics, hydraulics or electromagnets, the work-holder can be released.

DESCRIPTION OF THE EMBODIMENTS

A number of examples of the invention are described below with the aid of the attached drawings.

Figure 1:
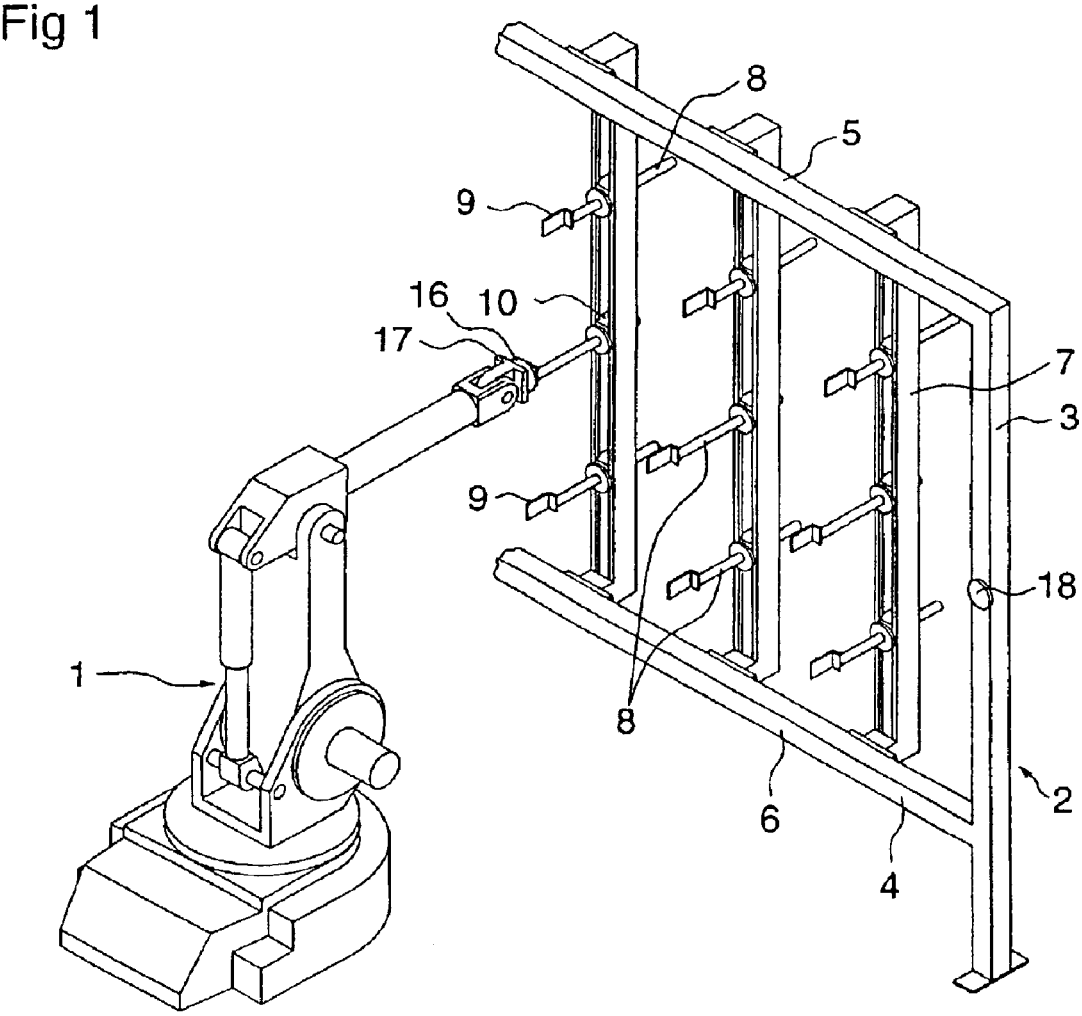
FIG. 1 illustrates the device and an industrial robot working together to set the fixing elements on the device rig in accordance with the invention method.

In FIG. 1, the method and the device in accordance with the invention are displayed in a perspective where it is shown how an industrial robot 1 is used as a manipulator to adjust the device 2, so that it can accept a 3-D structure in order to hold this structure fixed during one or more steps in the assembly. The device is comprised of a rig 3, which in this example is vertically mounted on a floor. If required, the rig may be built with a second level. It is possible, for example, for several rigs to be erected in the form of a prism, if an entire airframe is to be constructed simultaneously around these rigs, where the rigs make up the lateral surfaces of this prism. The rig 3 has a frame 4 with an upper 5 and a lower 6 longitudinal beam. These beams 5, 6 function as tracks for a number of main rails 7, which are arranged parallel to one another and where each one has a slide attachment with their ends in the upper 5 and lower 6 beam.

Because of the sliding attachment, the main rails 7 can move parallel along the rig with the ends of the main rails running in the beams 5, 6. The sliding attachment between beams 5, 6 and main rails 7 also comprises guiding means, so that the main rails 7 run perpendicular in relation to the beams 5, 6. The ends of the main rails run in the track-like beam by means of a slide bearing pilot, guide bar, guide roller or some equivalent known mechanism. An important feature here is that there is a lock between the sliding, or roller bearing mechanism belonging to the main rail, and the beam, so that the main rail can be locked and be held fixed in a predetermined position. This type of lock is known and may be embodied by clamping sleeves, which via spring forces are pressed in and exert friction between main rail and beam for the period of time the rails are to be held in a fixed position.

Each main rail 7 is equipped with a number of guide rails 8, which are attached with a slide bearing to the main rail 7. The guide rails 8 are arranged perpendicularly to the main rail 7. The guide rails 8 can slide parallel to the main rail 7 and can also slide in the axial direction. The function of the guide rail is illustrated in more detail in the drawings. The three directions of motion shown for the guide rails define a system of co-ordinates, where the main rails can be moved in the x direction along the beams, while the guide rails can be slid in the y direction, that is along the main rails, where the direction of the main rails defines the y direction. The axial motion that the guide rails 8 are capable of performing takes place in what here is called the z direction.

Each guide rail 8 has a fixing element 9 at its end. This fixing element 9 is intended to comprise the attachment points for the structures, such as frames or airframe skins, that are to be held in position by the device. Thus, the fixing element may be provided with screw holes, rivet holes or their equivalent for engaging against complementary means of fastening in the airframe structure.

The guide rail 8 has sliding bearings in a carriage-like device, to which we give the name carriage 10. The carriage 10 slides along the main rail by means of guides 11 that run along a conduit inside the main rail 7. The guide rail 8 can be moved in its axial direction by a first slide bearing 12 and a second slide bearing 13 in the other end of the carriage 10.

The guide rail 8 is locked in a fixed position in relation to the carriage 10 by means of a locking function. The locking function can be designed in a number of different ways. Locks of this type are known and may be embodied by clamping sleeves, which via spring forces are pressed in and exert friction between the carriage 10 and the main rail 7 as well as between the carriage and the guide rail 8 for the period of time the rails are to be held in a fixed position.

Figure 3:
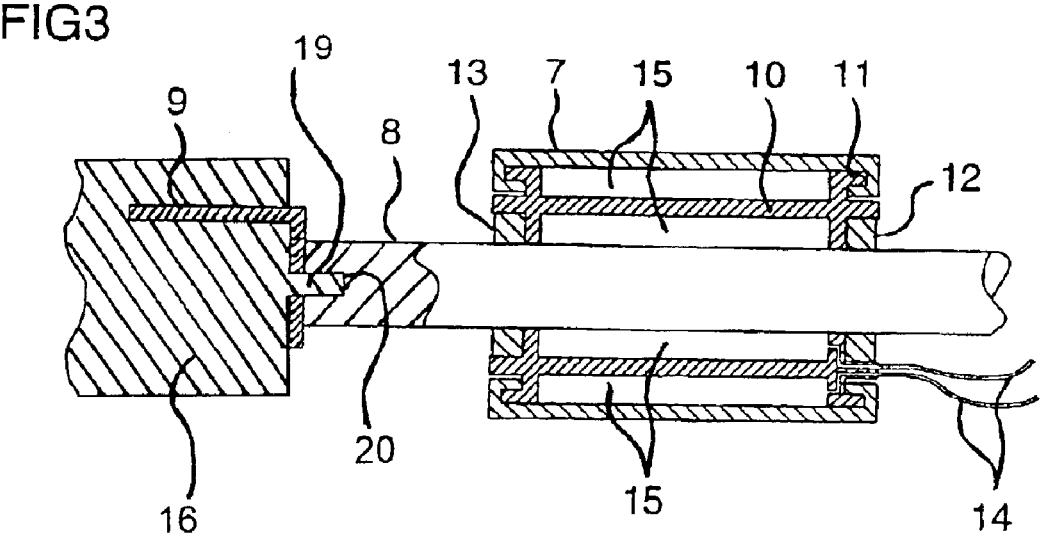
FIG. 3 is a schematic representation of a guide rail with its ancillary fixing element.

Since the technology of the aforementioned lock is well known, they are schematically represented in FIG. 3, where the position of the lock is indicated by area 15 and where, in this example, it is also assumed that the lock is unlocked by compressed air, which is fed from the robot via air ducts in the guide rail and then via air hoses 14. Thus, the robot 1 is passive during unlocking and locking of the rails 7, 8, that is to say the robot does not transfer any mechanical force to the device, although it does transmit the power effect of the lock by switching on or off a force-exerting medium, carried out in the example by pneumatic power, but where hydraulics and electromagnetism may also be used. In this way, the risk of disturbing the set position in which the fixing element 9 is held by the robot 1 is reduced during the locking step in the setting procedure.

The main rails are designed so that they slide in the beams 5, 6 using a similar carriage design as carriage 10, and which is not described further here. Even this carriage design may be locked in the way described above. The locking principle can be varied mechanically in several ways. Clamping sleeves can be used, for example. Unlocking is performed according to the above principle, where even in this case the compressed air is regulated by air hoses from the guide rail 8 to the locks at the ends of the main rails 7. By regulating the airflow from the robot via the guide rail 8, the main rail can be unlocked completely by supplying compressed air to the main rail's lock.

Figure 2:
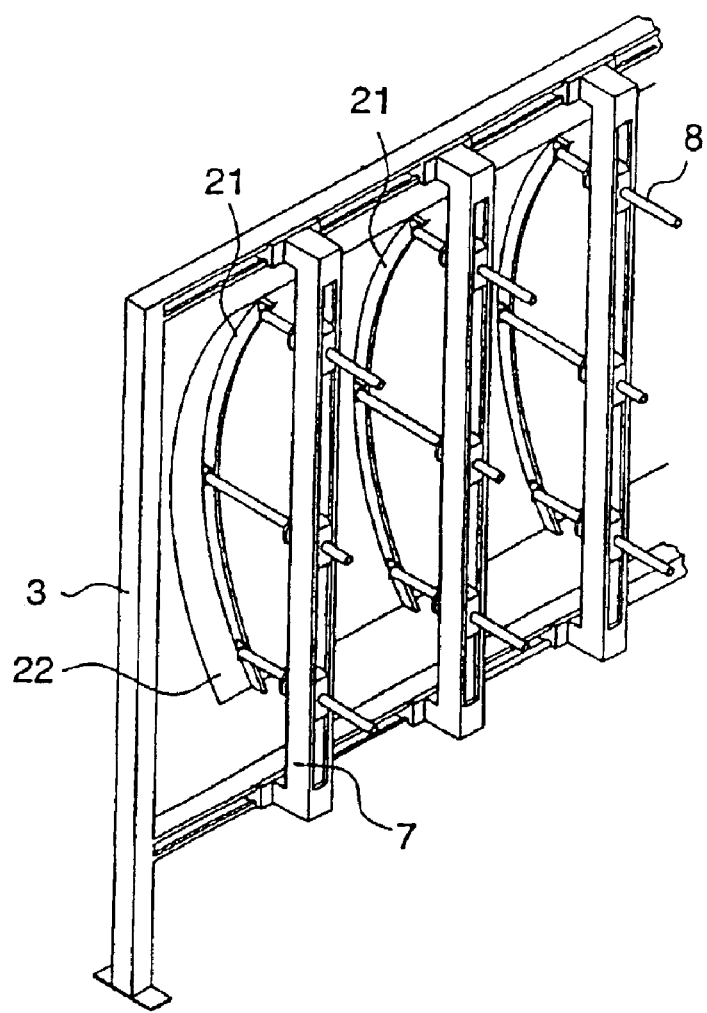
FIG. 2 shows the same device as in FIG. 1 from another view, and where additionally an airframe section is fixed to the positioned device.

The method according to the invention for regulating the device is exemplified and illustrated in FIGS. 1, 2, and 3. These drawings show a manipulator exemplified by an industrial robot 1. The robot 1 is preferably transportable on a track alongside the device 2. The robot's control system is supplied with data on the intended airframe's shape and thus is supplied with data relating to all fixing elements' requisite positions in space as given by space co-ordinates. The robot's control system is also calibrated with its own position in relation to the device 2. This is achieved by the robot hand 17 seeking a well measured calibration plate 18, so that the robot hand can sense the plate's 18 position, thereby allowing the robot's control system to read the relative positions of the robot 1 and the device 2 with good accuracy.

The guide rails are normally in their reference positions, for example at the lower part of each main rail 7. According to the method, the robot starts its setting procedure of the device by, for a first main rail 7, searching for the first available guide rail 8 on the main rail. This is performed by the robot having already changed tool since a setting tool 16 is connected to the tool shunter on the robot hand 17. The setting tool 16 is a mechanism designed for engaging with the fixing element 9. Engagement is possible since the setting tool 16 is equipped with a male part 19 and the fixing element with a female part 20, which together comprise a coupling, and which engage with high precision with each other. The coupling contains connections for a pressure medium that can be conveyed between the robot and the tool for performing unlocking of the above mentioned locks on setting a fixing element, and locking of corresponding locks when the fixing element is placed in the correct position. When the first guide rail 8 has been found and the setting tool 16 on the robot hand is attached to the fixing element 9, both the main rail 7 lock and the guide rail 8 lock are unlocked.

In its control system, the robot has position data in the form of co-ordinates in x, y and z directions for the fixing element 9 of its associated guide rail 8 which the robot is holding at the moment, thereby allowing the robot to freely move the fixing element in the said three directions. This permits the main rail 7 to slide in the x direction, when the correct x co-ordinates are entered, and the guide rail 8 to slide in the y and z directions, when y and z co-ordinates are entered. When the robot has moved the fixing element 9 to its predetermined position, both the main rail and the guide rail are locked again. The control system then supplies the robot with data on the position of the next guide rail 8 on the same main rail as before, whereby the robot searches for the new guide rail, connects itself to it and moves, this time in the y and z directions only, the guide rail's fixing element 9 to the predetermined position. In this case, the lock for the main rail 7 is never unlocked. It is only the guide rail that is slid in the y and z directions. For the remaining guide rails 8 on the same main rail 7, a similar procedure is followed.

When all used fixing elements 9 on a main rail 7 are positioned, an equivalent procedure is carried out for the other main rails 7 used on the rig, with their accompanying guide rails and fixing elements 9.

When all fixing elements 9 on the device are positioned according to the predetermined data, mounting of, for example, airframe frames to the device can commence. According to the example, a frame 21 is mounted on the fixing elements 9 located on the same main rail, so that all frames are held in place within the required limits of tolerance and together define the desired airframe profile. An airframe skin 22 in one or more sections is fixed at several points and then fastened to the previously secured frames. Next, frames and skin can be put together using screws, rivets or with equivalent fastening devices. As mentioned earlier, the method in accordance with the invention has the advantage that the industrial robot used for regulating the device may also be used as an assembly robot for fastening together the frames and the skin, where the robot is used for drilling holes, as well as screwing or riveting.

The fixing element 9 may be replaced, so that it can be adapted to different types of fixed objects, such as frames or skins.

A variation of the invention is to use a semi-flexible solution where a portal robot used as a manipulator for setting the fixing elements can run alongside the rig and perform the procedure for setting the fixing elements. In this case, the manipulator cannot be used for any other operations, although there is still the advantage, in comparison to known techniques, that the fixing elements may be positioned freely within the space volume given by the device.

In a further variation of the invention the manipulator can be embodied by a manual manipulator, which would then be designed as a hand tool, and which in a way corresponding to that described above for the robot hand 17 is calibrated against the device's calibration plate 18 and is connected to the fixing elements 9. On a display connected to the hand tool, the position of the fixing element to which the hand tool is joined is read, whereby it is possible, after unlocking the said locks in a way similar to that done by the robot 1, to move the tool to a position where the tool moves the fixing element 9 to the desired position in x, y and z directions. When the desired position is achieved, the rails are locked in the same way as presented above. To ensure accuracy in the setting procedure when using the hand tool, it may be suspended from a balancing mechanism that can move alongside the rig in the x and y directions. Measurement of the position of the hand tool in relation to the device is in this case carried out by a laser position sensor, which measures by laser the hand tool's position in terms of the three space co-ordinates and shows the current position of the hand tool, or rather the position of the attachment point for the fixing element being held by the hand tool, on a display so that the operator of the hand tool can continuously monitor the said current position and make the necessary movements of the hand tool to achieve the desired position of the fixing element 9.

For the examples described above, it has been mentioned that the positions of the fixing elements are set based on three co-ordinates that are assumed to be oriented perpendicular to one another. However, it is also possible to use other co-ordinates, oriented at different angles to each other than those adopted above.

What is claimed is:

1. A method for regulating a device used for assembling aircraft airframe pieces, where the device comprises a rig comprising main rails that can slide parallel to each other alongside the rig along a first co ordinate x, and on each main rail a number of guide rails which can both slide parallel to each other along the main rail along a second co ordinate y, and axially along a third co-ordinate z, and with a fixing element at the end of the guide rail, where the method involves the following steps:
   a) a manipulator grasps a a fixing element of a guide rail after which the fixing element is moved by the manipulator in directions x, y and z so that the fixing element is made to adopt a predetermined position in space,
   b) the position of the fixing element in space is locked in relation to the rig by an automatic locking function,
   c) steps a and b are repeated for a predetermined number of fixing elements.

2. Method as in claim 1 for said regulating of the device comprising the steps:
   a) the fixing element is grasped and moved by the manipulator, while during the movement of the fixing element:
      a1) the main rail to which the fixing element is connected is slid parallel to the x direction,
      a2) the guide rail to which the fixing element is connected is slid parallel to the y direction,
      a3) the guide rail is slid axially in the z direction so that its fixing element is set at a given z co-ordinate,
      a4) when the fixing element has adopted its predetermined position the main rail and the guide rail are locked by said automatic locking function,
   b) for a guide rail on main rail, a manipulator grasps a fixing element of a guide rail after which the fixing element is moved by the manipulator in directions x, y and z so that the fixing element is made to adopt a predetermined position in space, and while during the movement of the fixing element:
      b1) the guide rail to which the fixing element is connected is slid parallel to the y direction,
      b2) the guide rail is slid axially in the z direction so that its fixing element is set at a given z co-ordinate,
      b3) when the fixing element has adopted its predetermined position the guide rail are locked by an automatic locking function,
   c) steps a and b are repeated for each main rail.

3. Method as in claim 2, where the fixing element has a coupling component and the manipulator has a complementary coupling component, which couple with each other during regulating of the device.

4. Method as in claim 3, where a coupling created by said coupling components has means for transferring a medium that activates or deactivates the lock or locks that are associated with the fixing element that is being set by the manipulator, and where said medium is supplied by the manipulator.

5. Method as in claim 1, where setting of the fixing elements is done by means of a separate industrial robot, which herein constitutes the said manipulator.

6. Method as in claim 5, where the a robot control system retrieves information on the position of the rig from at least one reference body located on the rig.

7. Method as in claim 1, where setting of the fixing elements is done by means of a portal robot, which herein constitutes said manipulator and which is arranged so that said portal robot straddles the rig and is capable of running alongside the rig.

8. Method as in claim 1, where setting of the fixing elements is done by means of a hand tool, which herein constitutes the said manipulator.

9. Method as in claim 8, where the position of the hand tool is measured by a measuring device.

10. Method as in claim 9, where during regulating, the hand tool is supported by a supporting device that can be moved along the rig.

11. Method as in claim 9 wherein said measuring device is a laser instrument.

12. A device used for assembling aircraft airframe pieces, wherein the device comprises a rig comprising main rails that can slide parallel to each other alongside the rig along a first co-ordinate x, and on each main rail a number of guide rails which can both slide parallel to each other along the main rail along a second co-ordinate y, and axially along a third co-ordinate z, and at the end of the guide rail there is a fixing element, and wherein the guide rails are arranged in a carriage, where the carriage slides along the main rail by means of guides.

13. Device as in claim 12, wherein the main rails can slide in such a way that a number of fixing elements attached to the rails can be positioned freely in three co-ordinates x, y, z in space within a given volume.

14. Device as in claim 12, wherein the ends of the main rails can slide in parallel arranged beams, which make up a part of a framework in the rig.

15. Device as in claim 14, wherein the ends of the main rails are equipped with locks, whereby the main rails may be locked to said beams.

16. Device as in claim 15, wherein the locks are open and closed by means of pneumatic, hydraulic or electrical power transmission.

17. Device as in claim 12, wherein the guide rail, by means of sliding bearings, can move relative to the carriage in an axial direction.

18. Device as in claim 17, wherein the carriage is equipped with locks, whereby the carriage is locked to the main rail along which the carriage runs, and the guide rail running in the carriage is locked to said carriage.

* * * * *